(12) United States Patent
Appelman et al.

(10) Patent No.: US 8,719,422 B2
(45) Date of Patent: May 6, 2014

(54) TRANSPARENT RECONNECTION

(75) Inventors: Barry Appelman, Great Falls, VA (US); Eric Bosco, McLean, VA (US); Rich Thornberg, Centreville, VA (US)

(73) Assignee: AOL Inc., Dulles, VA (US)

(*) Notice: Subject to any disclaimer, the term of this patent is extended or adjusted under 35 U.S.C. 154(b) by 168 days.

(21) Appl. No.: 12/856,719

(22) Filed: Aug. 16, 2010

(65) Prior Publication Data

US 2011/0035793 A1 Feb. 10, 2011

Related U.S. Application Data

(63) Continuation of application No. 10/158,214, filed on May 31, 2002, now Pat. No. 7,917,638.

(51) Int. Cl.
*G06F 13/00* (2006.01)

(52) U.S. Cl.
USPC .......................................... 709/227

(58) Field of Classification Search
CPC ..... G06F 13/107; H04L 63/08; H04L 63/126; H04L 57/14; H04L 12/2856; H04L 12/2834; H04L 12/5692; H04L 41/0663; H04L 43/0811; H04L 65/1066
USPC .......................................... 709/224, 227, 229
See application file for complete search history.

(56) References Cited

U.S. PATENT DOCUMENTS

| | | | |
|---|---|---|---|
| 5,425,026 A | 6/1995 | Mori | |
| 5,485,460 A | 1/1996 | Schrier et al. | |
| 5,657,452 A | 8/1997 | Kralowetz et al. | |
| 5,768,525 A | 6/1998 | Kralowetz et al. | |
| 5,905,873 A | 5/1999 | Hartmann et al. | |
| 6,269,402 B1* | 7/2001 | Lin et al. | 709/227 |
| 6,278,697 B1 | 8/2001 | Brody et al. | |
| 6,341,312 B1 | 1/2002 | French et al. | |
| 6,456,857 B1 | 9/2002 | Bos et al. | |
| 6,463,477 B1 | 10/2002 | Fontenot | |
| 6,487,596 B1 | 11/2002 | Douglis et al. | |
| 6,487,598 B1 | 11/2002 | Valencia | |
| 6,577,643 B1 | 6/2003 | Rai et al. | |
| 6,591,304 B1 | 7/2003 | Sitaraman et al. | |
| 6,598,082 B1* | 7/2003 | Douglis et al. | 709/227 |
| 6,618,393 B1 | 9/2003 | Chiles et al. | |
| 6,757,731 B1 | 6/2004 | Barnes et al. | |
| 6,766,373 B1 | 7/2004 | Beadle et al. | |
| 6,778,541 B2 | 8/2004 | Houston et al. | |
| 7,107,348 B2 | 9/2006 | Shimada et al. | |
| 7,139,822 B2* | 11/2006 | Guenther et al. | 709/224 |
| 2002/0035699 A1 | 3/2002 | Crosbie | |
| 2002/0085567 A1 | 7/2002 | Ku et al. | |
| 2002/0174232 A1* | 11/2002 | Kikuta et al. | 709/227 |
| 2006/0117106 A1* | 6/2006 | Abdo et al. | 709/227 |

* cited by examiner

*Primary Examiner* — Tamara T Kyle

(74) *Attorney, Agent, or Firm* — Finnegan, Henderson, Farabow, Garrett & Dunner, LLP

(57) ABSTRACT

In the event of an unintentional interruption, a token issued by a host system to a client system is used to reestablish communications without disrupting applications on the client system. If the host system provided an Internet Protocol address to the client system to be used during the interrupted communications session, the host system reserves the communications address during an interruption in communications for a period sufficient to permit reestablishment of communications using the reserved address.

20 Claims, 8 Drawing Sheets

TRANSPARENT RECONNECTION

This application is a continuation of U.S. application Ser. No. 10/158,214, filed May 31, 2002 now U.S. Pat. No. 7,917,638, and titled "Transparent Reconnection," which is incorporated herein by reference in its entirety. U.S. application Ser. No. 09/867,546, filed May 31, 2001, and titled "Local Protocol Server," is incorporated herein by reference in its entirety.

TECHNICAL FIELD

This invention relates to communicating between two systems.

BACKGROUND

When two systems communicate with one another, the systems may experience an unintended interruption of the communications session. The interruption may require one system to initiate communications to reestablish the communications session. In the case of a secured system, an interruption generally requires the system seeking access to resubmit authentication information before communications can be reestablished. The interruption may disrupt applications on one of the systems.

SUMMARY

In one general aspect, communications between a user system and an accessible system include establishing a communications session between a user system and an accessible system such that at least one application at the user system makes use of the communication session, experiencing an unintentional interruption in the communications session, and reestablishing the communications session in a way that at least one of the applications making use of the communications session is unaffected by the interruption and the reestablishment of the communications session have occurred.

Implementations may include one or more of the following features. For example, communications may be reestablished by using a local server or an operating system to mask the unintended interruption. At least one of the applications making use of the communications session may be unaware that the interruption and the reestablishment of the communications session has occurred. The user system may receive and submit a reconnection token to reestablish communications after an unintentional interruption has occurred. In some implementations, a reconnection token can only be used once to reestablish communications and must be submitted within a predefined period of time after the unintended interruption is experienced. The user system may request and store the reconnection token. Submitting the reconnection token may include having the user system determine whether the reconnection token exists, and, if so, retrieve and send the reconnection token to the accessible system. Sending the reconnection token may include sending the accessible system the reconnection token alone or in combination with authentication information.

Implementations may include having the user system submit a request for access and receive access to the accessible system. The user system may receive an Internet Protocol or other address designated by the accessible system for accessing the accessible system. The user system may detect the unintentional interruption. When establishing communications between a user system and a secured system, the user system may receive a request for authentication, information and may submit the authentication information.

In another general aspect, communications between a user system and an accessible system include providing an accessible-system-designated communications address to a user system, establishing a communications session between the user system and an accessible system such that at least one application at the user system is enabled, experiencing an unintentional interruption, in the communications session, detecting the interruption, reserving the accessible-system-designated communications address, and reestablishing the communications session such that at least one application is unaware that the interruption has occurred.

Implementations may include one or more of following features. For example, one or more of the applications making use of the communications session may be unaware that the interruption and the reestablishment of the communications session have occurred. The accessible-system-designated communication address may be an Internet Protocol address. The accessible system may reserve the accessible-system-designated communications address for a predetermined period of time beginning from a point at which the interruption is detected or until the receipt of a reconnection token from the user system. The accessible system may detect the interruption by receipt of a request for access or a reconnection token from an interrupted user system. The accessible system may receive a reconnection token from an interrupted user system and authenticate the user system based on the reconnection token.

Implementations may include having the accessible system receive the reconnection token from the interrupted user system alone or in combination with authentication information. The accessible system may determine whether a received reconnection token is valid. Determining whether a received reconnection token is valid may include determining whether the received reconnection token has expired or is included in a list of valid reconnection tokens. The accessible system may receive a request for access from the user system when establishing communications before experiencing an interruption in a communications session.

Implementations may include having a secure system request and receive authentication information from the user system. Authentication information that is requested and received may include a user name and a password. A secure system may request and receive authentication information when establishing communications before experiencing an interruption, or after experiencing an interruption. The secure system may request authentication information after experiencing an interruption by using a different interface if a reconnection token has been issued to the user system than an interface used if a reconnection token has not been issued to the user system.

In another general aspect, communications between a user system and an accessible system include establishing a communications session between a user system and an accessible system such that a session identifier is associated with the communications session, experiencing an unintentional interruption in the communications session, and reestablishing the communications session using the session identifier associated with the interrupted communications session. Implementations may include one or more of the following features. For example, communications may be reestablished by using a local server or an operating system to mask the unintended interruption. The user system may receive and submit a reconnection token to reestablish communications after an unintentional interruption has occurred. In some implementations, a reconnection token can only be used once to reestablish communications and must be submitted within a predefined period of time after the unintended interruption is experienced.

Implementations of the techniques discussed above may include a method or cess, an apparatus or system, or computer software on a computer-accessible medium.

The details of one or more implementations set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

In the event of an unintentional interruption, a token issued by a host system to a client system may be used to reestablish communications without disrupting applications on the client system. If the host system provided a communications address (such as, for example, an Internet Protocol address) to the client system to be used during the interrupted communications session, the host system may reserve the communications address during an interruption, in communications for a period, sufficient to permit reestablishment of communications using the reserved address, and may use the token as a reference while reestablishing communications using that address.

Figure 1:
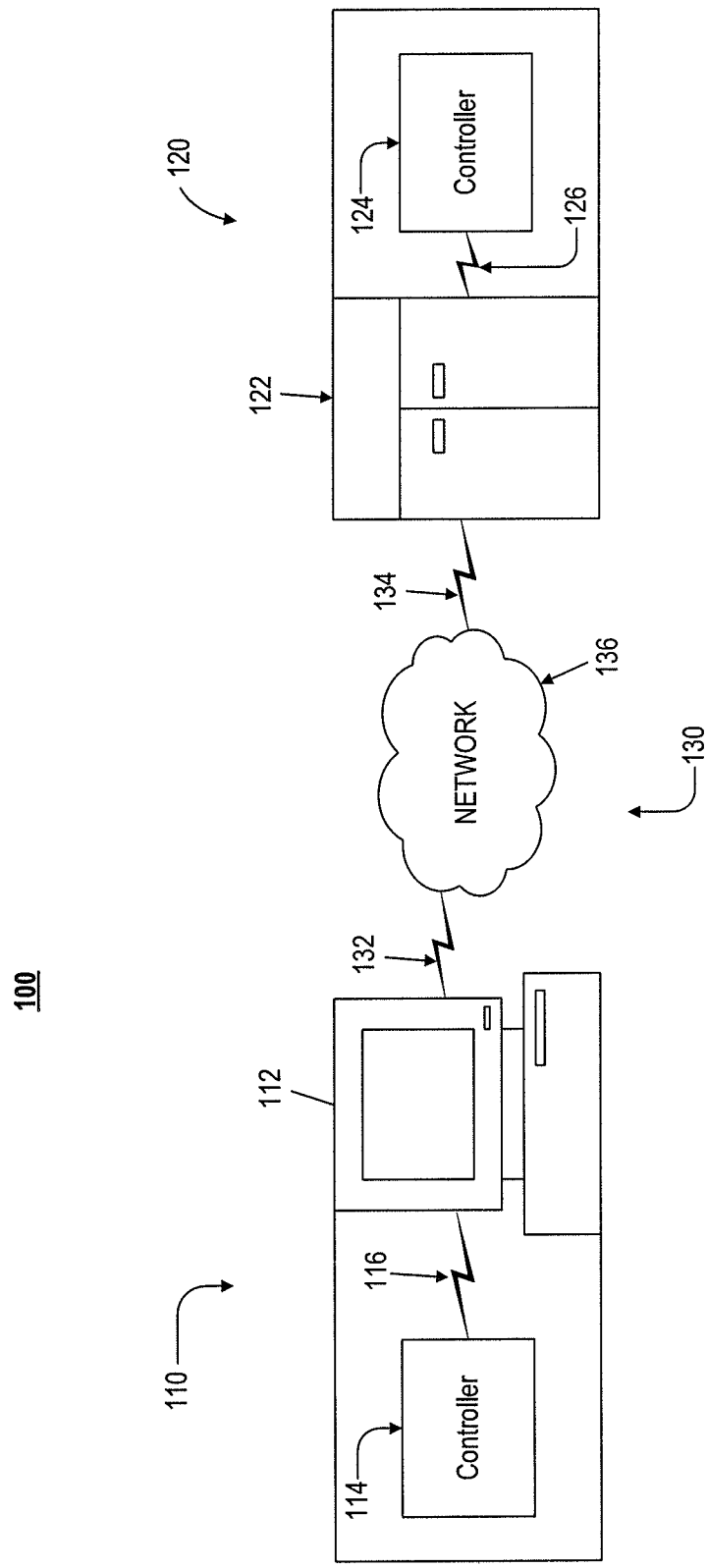
FIG. 1 is a block diagram illustrating an exemplary communications system capable of identifying unauthorized communications systems.
Figure 2:
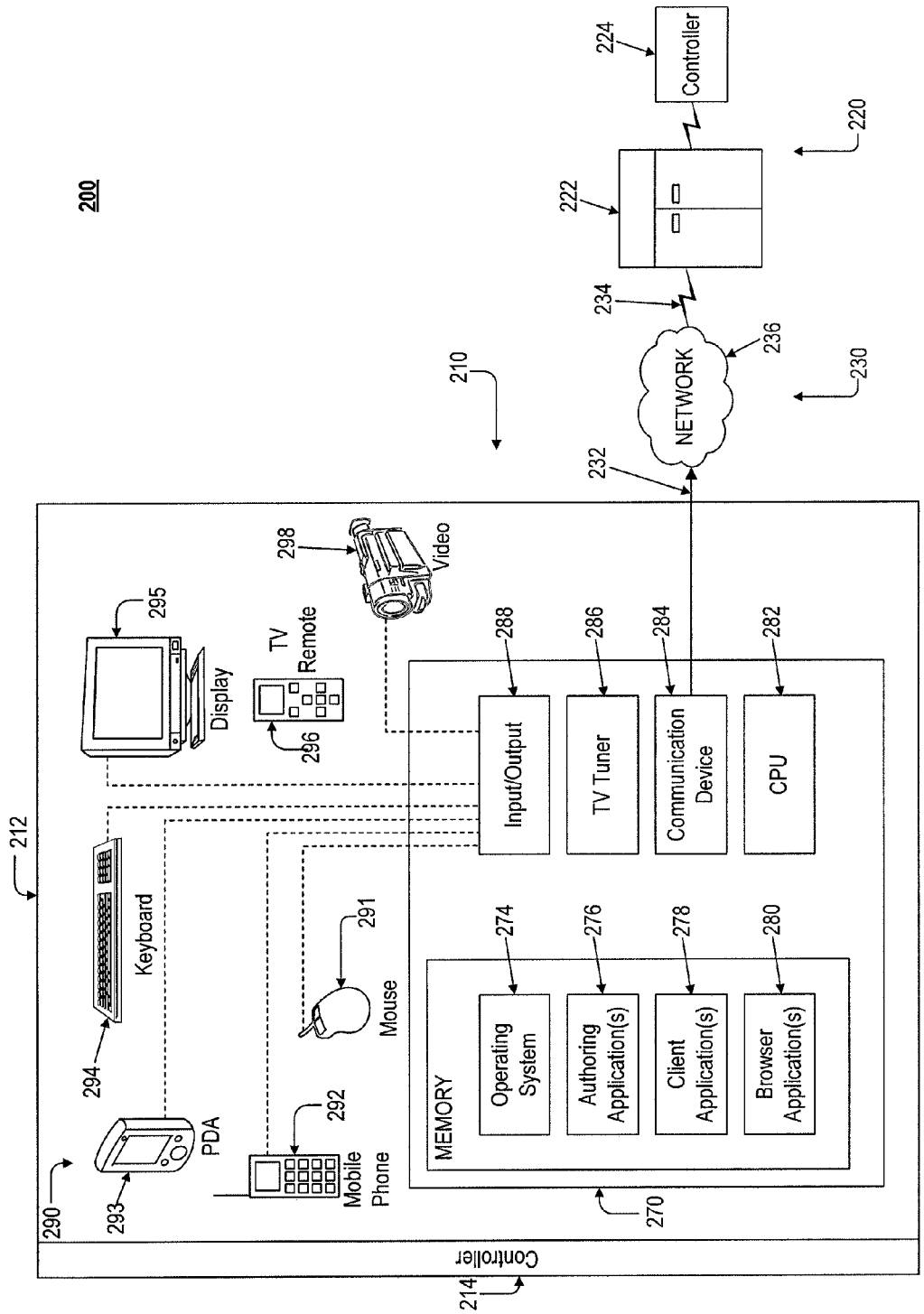
FIGS. 2, 3, and 4 are block diagrams illustrating aspects of the communications system of FIG. 1.
Figure 3:
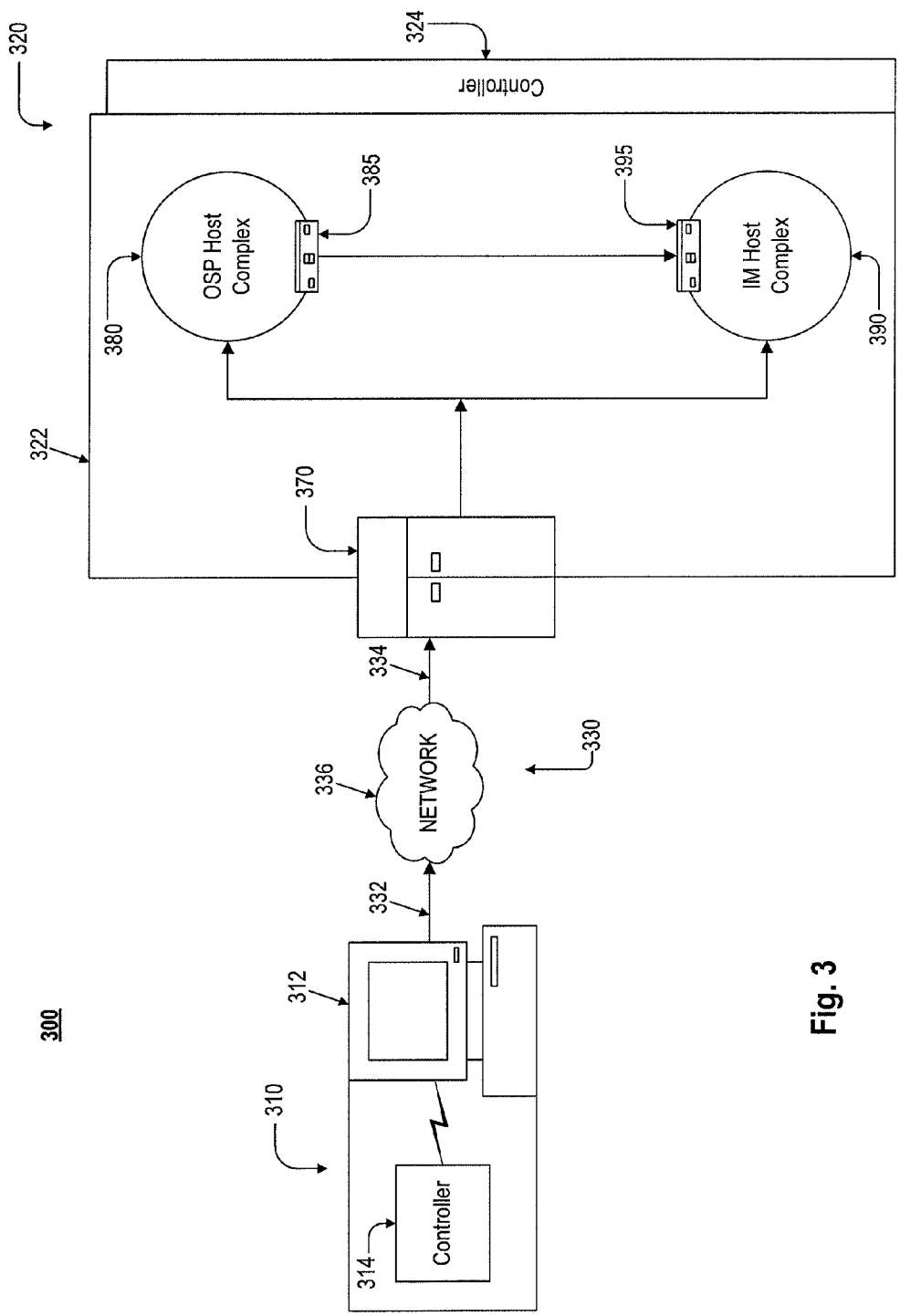

For illustrative purposes, FIGS. 1-3 describe a communications system for implementing techniques for transferring files between subscribers of an instant messaging host complex. For brevity, several elements in the figures are represented as monolithic entities. However, as would be understood by one skilled in the art, these elements each may include numerous interconnected computers and components designed to perform a set of specified operations and/or dedicated to a particular geographical region.

Referring to FIG. 1, a communications system 100 is capable of delivering and exchanging data between a client communications system 110 and a host communications system 120 through a communications link 130. The client communication system 110 typically includes one or more client devices 112 and/or client controllers 114, and the host system 120 typically includes one or more host devices 122 and/or host controllers 124. For example, the client communication system 110 or the host system 120 may include one or more general-purpose computers (e.g., personal computers), one or more special-purpose computers (e.g., devices specifically programmed to communicate with each other and/or the client communication system 110 or the host system 120), or a combination of one or more general-purpose computers and one or more special-purpose computers. The client communication system 110 and the host system 120 may be arranged to operate within or in concert with one or more other systems, such as, for example, one or more LANs ("Local Area Networks") and/or one or more WANs ("Wide Area Networks").

The client device 112 (or the host controller 122) is generally capable of executing instructions under the command of a client controller 114 (or a host controller 124). The client device 112 (or the host device 122) is connected to the client controller 114 (or the host controller 124) by a wired or wireless data pathway 116 or 126 capable of delivering data.

Each of the client device 112, the client controller 114, the host device 122, and the host controller 124 typically includes one or more hardware components and/or software components. An example of a client device 112 or a host device 122 is a general-purpose computer (e.g., a personal computer) capable of responding to and executing instructions in a defined manner. Other examples include a special-purpose computer, a workstation, a server, a device, a component, other physical or virtual equipment, or some combination thereof capable of responding to and executing instructions.

An example of the client controller 114 or the host controller 124 is a software application loaded on the client device 112 or the host device 122 for commanding and directing communications enabled by the client device 112 or the host device 122. Other examples include a program, a piece of code, an instruction, a device, a computer, a computer system, or a combination thereof; for independently or collectively instructing the client device 112 or the host device 122 to interact and operate as described. The client controller 114 and the host controller 124 may be embodied permanently or temporarily in any type of machine, component, physical or virtual equipment, storage medium, or propagated signal capable of providing instructions to the client device 112 or the host device 122.

The communications link 130 typically includes a delivery network 136 that provides a direct or indirect communications path between the client system 110 and the host system 120, irrespective of physical separation. Examples of a delivery network 136 include the Internet, the World Wide Web, WANs, LANs, analog or digital wired and wireless telephone networks (e.g., PSTN ("Public Switched Telephone Network"), ISDN ("Integrated Services Digital. Network"), and DSL ("Digital Subscriber Line") including various forms of DSL such as SDSL ("Single-line Digital Subscriber Line"), ADSL ("Asymmetric Digital Subscriber Loop), HDSL ("High bit-rate Digital Subscriber Line"), and VDSL ("Very high bit-rate Digital Subscriber Line), radio, television, cable, satellite, and/or any other delivery mechanism for carrying data. The communications link 130 may include communications pathways 132, 134 that enable communications through the one or more delivery networks 136 described above. Each of the communications pathways 132, 134 may include, for example, a wired, wireless, cable or satellite communications pathway.

FIG. 2 illustrates a communications system 200 including a client system 210 that communicates with a host system 220 through a communications link 230. Client system 210 typically includes one or more client devices 212 and one or more client controllers 214 for controlling the client devices 212. Host system 220 typically includes one or more host devices 222 and one or more host controllers 224 for controlling the host devices 222. The communications, link 230 may include communications pathways 232, 234 that enable communications through the one or more delivery networks 236.

Examples of each element within the communications system of FIG. 2 are broadly described above with respect to FIG. 1. In particular, the host system 220 and the communications link 230 typically have attributes comparable to those described with respect to the host system 120 and the communications link 130 of FIG. 1, respectively. Likewise, the client system 210 of FIG. 2 typically has attributes comparable to and may illustrate one possible implementation of the client system 110 of FIG. 1.

The client device 212 typically includes a general purpose computer 270 that has an internal or external storage 272 for storing data and programs such as an operating system 274 (e.g., DOS ("Disk Operating System"), Windows®, Windows® 95, Windows® 98, Windows® 2000, Windows® NT, Windows® Millennium Edition, Windows® XP, OS/2, and Linux) and one or more application programs. Examples of application programs include authoring applications 276 (e.g., word processing, database programs, spreadsheet programs, presentation programs, and graphics programs) capable of generating documents or other electronic content; client applications 278 (e.g., AOL ("America Online") client, CompuServe client, AIM ("America Online Instant Messenger") client, AOL TV ("America Online Television") client, and ISP ("Internet Service Provider") client) capable of communicating with other computer users, accessing various computer resources, and viewing, creating, or otherwise manipulating electronic content; and browser applications 280 (e.g., Netscape's Navigator and Microsoft's Internet Explorer) capable of rendering standard Internet content.

The general-purpose computer 270 also includes a central processing unit (CRT) 282 for executing instructions in response to commands from the client controller 214. In one implementation, the client controller 214 includes one or more of the application programs installed on the internal or external storage 272 of the general-purpose computer 270. In another implementation, the client controller 214 includes application programs externally stored in and executed by one or more device(s) external to the general-purpose computer 270.

The general-purpose computer may include a communications device 284 for sending and receiving data. One example of the communications device 284 is a modem. Other examples include a transceiver, a set-top box, a communications card, a satellite dish, an antenna, or another network adapter capable of transmitting and receiving data over the communications link 230 through a wired or wireless data pathway 232. The general-purpose computer 270 also may include a TV ("television") tuner 286 for receiving television programming in the form of broadcast, satellite, and/or cable TV signals. As a result, the client device 212 can selectively and/or simultaneously display network content received by communications device 284 and television, programming content received by the TV tuner 286.

The general-purpose computer 270 may include an input/output interface 288 that enables a wired or wireless connection to various peripheral devices 290. Examples of peripheral devices 290 include, but are not limited to, a mouse 291, a mobile phone 292, a personal digital assistant (FDA) 293, a keyboard 294, a display monitor 295 with or without a touch screen input, and/or a TV remote control 296 for receiving information from and rendering information to subscribers. Other examples may include voice recognition and synthesis devices.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 212. For example, the mobile phone 292 or the PDA 293 may include computing and networking capabilities, and may function as a client device 212 by accessing the delivery network 236 and communicating with the host system 220. Furthermore, the client system 210 may include one, some or all of the components and devices described above.

Referring to FIG. 3, a communications system 300 is capable of delivering and exchanging information between a client system 310 and a host system 320 through a communications link 330. Client system 310 typically includes one or more client devices 312 and one or more client controllers 314 for controlling the client devices 312. Host system 320 typically includes one or more host devices 322 and one or more host controllers 324 for controlling the host devices 322. The communications link 330 may include communications pathways 332, 334 that enable communications through the one or more delivery networks 336.

Examples of each element within the communications system of FIG. 3 are broadly described above with respect to FIGS. 1 and 2. In particular, the client system 310 and the communications link 330 typically have attributes comparable to those described with respect to client systems 110 and 210 and communications links 130 and 230 of FIGS. 1 and 2. Likewise, the host system 320 of FIG. 3 may have attributes comparable to and may illustrate one possible implementation of the host systems 120 and 220 shown in FIGS. 1 and 2.

The host system 320 includes a host device 322 and a host controller 324. In general, the host controller 324 is capable of transmitting instructions to any or all of the elements of the host device 322. For example, in one implementation, the host controller 324 includes one or more software applications loaded on the host device 322. However, in other implementations, as described above, the host controller 324 may include any of several other programs, machines, and devices operating independently or collectively to control the host device 322.

The host device 322 includes a login server 370 for enabling access by subscribers and routing communications between the client system 310 and other elements of the host device 322. The host device 322 also includes various host complexes, such as the depicted OSP ("Online Service Provider") host complex 380 and IM ("Instant Messaging") host complex 390. To enable access to these host complexes by subscribers, the client system 310 may include communications software, such as an OSP client application and an IM client application. The OSP and IM communications software applications are designed to facilitate interaction by the subscriber with the respective services and, in particular, may provide access to all the services available within the respective host complexes. For example, a subscriber may use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the Web.

Typically, the OSP host complex 380 supports different services, such as email, discussion groups, chat, news services, and Internet access. The OSP host complex 380 is generally designed with an architecture that enables the machines within the OSP host complex 380 to communicate with each other using certain protocols (e.g., standards, formats, conventions, rules, and structures) to enable the transfer of data. The OSP host complex 380 ordinarily employs one or more OSP protocols and custom dialing engines to enable access by selected client applications. The OSP host complex 380 may define one or more specific protocols for each service based on a common, underlying proprietary protocol.

In general, the IM host complex 390 is independent of the OSP host complex 380, and supports instant messaging services regardless of a subscriber's network or Internet access. Thus, the IM host complex 390 allows subscribers to send and receive instant messages, whether or not they have access to any particular ISP. The IM host complex 390 may support associated services, such as administrative matters, advertising, directory services, chat, and interest groups related to the instant messaging. The IM host complex 390 has an architecture that enables all of the machines within the IM host complex to communicate with each other. To transfer data, the IM host complex 390 employs one or more standard or exclusive IM protocols.

The host device 322 may include one or more gateways that connect and therefore link complexes, such as the OSP host complex gateway 385 and the IM host complex gateway 395. The OSP host complex gateway 385 and the IM host complex gateway 395 may directly or indirectly link the OSP host complex 380 with the IM host complex 390 through a wired or wireless pathway. Ordinarily, when used to facilitate a link between complexes, the OSP host complex gateway 385 and the IM host complex gateway 395 are privy to information regarding a protocol anticipated by a destination complex, which enables any necessary protocol conversion to be performed incident to the transfer of data from one complex to another. For instance, the OSP host complex 380 and IM host complex 390 may use different protocols such that transferring data between the complexes requires protocol conversion by or at the request of the OSP host complex gateway 385 and/or the IM host complex gateway 395.

Figure 4:
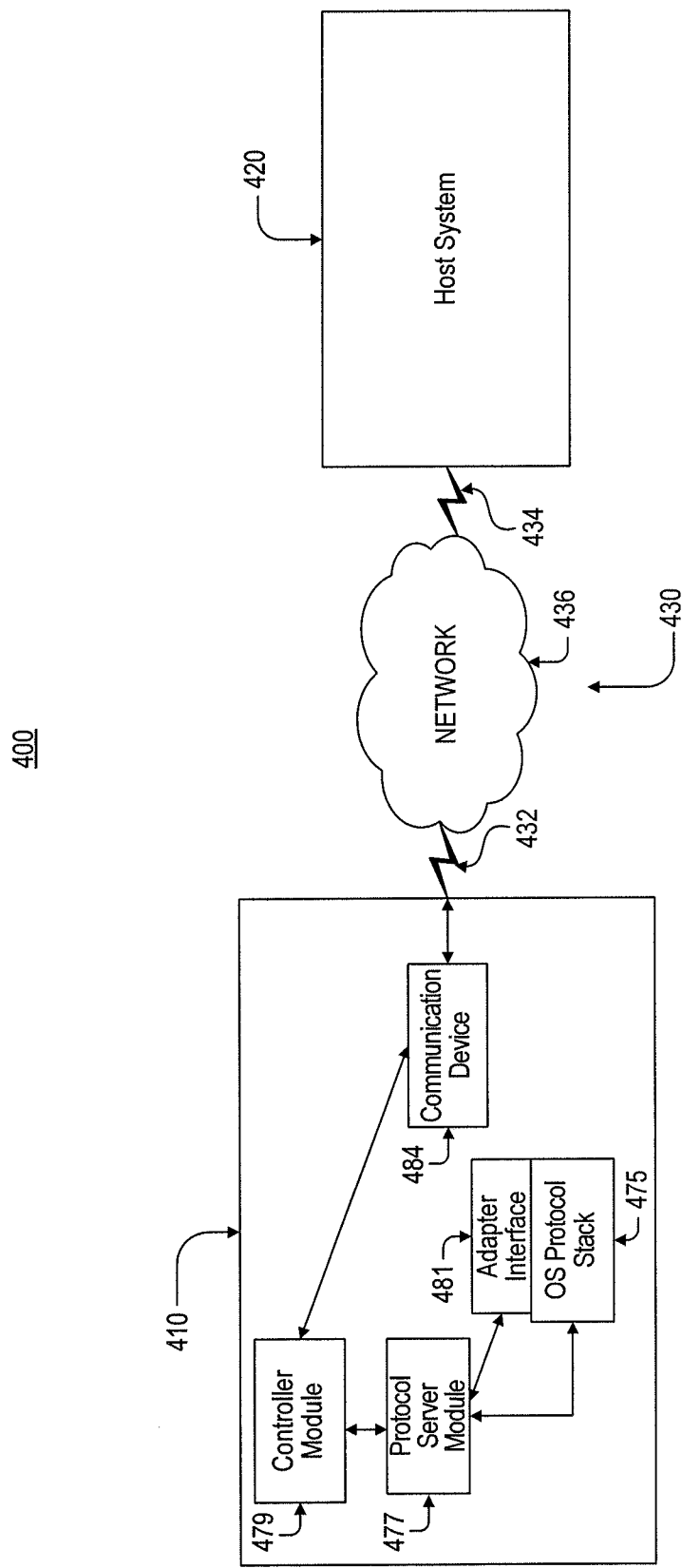

FIG. 4 shows an implementation of a communications system 400 that includes a client system 410, a host system 420, and communications link 430. The communications link 430 may include communications pathways 432, 434 that enable communications through the one or more delivery networks 436.

Examples of each element within the communications system 400 of FIG. 4 are broadly described above with respect to FIGS. 1-3. In particular, the host system 420 and the communications link 430 typically have attributes comparable to those described with respect to host systems 120, 220, and 320 and communications links 130, 230, and 330 shown in FIGS. 1-3. Likewise, the client system 410 of FIG. 4 may have attributes comparable to and may illustrate one possible implementation of the client systems 110, 210, and 310 shown in FIGS. 1-3, and the communications pathways 432, 434 and delivery networks 436 typically have attributes comparable to and may describe one possible implementation of the communications pathways 132, 134, 232, 234, 332, and 334, and delivery networks 136, 236, and 336 shown in FIGS. 1-3.

The client system 410 may include one or more of an operating system (OS) protocol stack 475, a protocol server module 477, a controller module 479, an optional adapter interface 481, and a communications device 484. The OS protocol stack 475 may be included as part of an operating system, such as, for example, the operating system 274 described above with respect to FIG. 2. The OS protocol stack 475 may be designed for or capable of enabling the operating system to encapsulate data for communication. In general, the OS protocol stack 475 may be implemented using a PPP ("Point-to-Point Protocol") interface in operating systems such as the operating system 274 described above with respect to FIG. 2. For example, Windows™ operating systems generally include a NDISWAN ("Network Device Interface Specification for Wide Area Networks") component that functions as the PPP interface. Yet in some Windows™ operating systems and in some other types of operating systems, a PPP Daemon (PPPD) may function as the PPP interface.

The protocol server module 477 may be structured and arranged to interface with the client device operating system protocol stack 475 and the controller module 479. The protocol server module 477 enables the client system 410 and the host system 420 to communicate through the delivery network 436 using any one of several encapsulating protocols.

The protocol server module 477 may intercept and take over a communications session that the OS protocol stack 475 attempts to initiate with the host system 420 using a first protocol. For example, the OS protocol stack 475 may start a communications session intending to negotiate and exchange configuration data with the host system 420 using the first protocol. Instead, the protocol server module 477 may "spoof" the host system 420 and intercept the communications session from the OS protocol stack 475, rather than having the OS protocol stack 475 communicate directly with the host system 420. The spoofing typically is transparent to the OS protocol stack 475 and the host system 420. By capturing the communications session at the protocol server module 477, the protocol server module 477 may negotiate a separate communications session with the host system 420 using a second protocol that is different from the first protocol. Based on this second protocol, data from the OS protocol stack 475 may be routed to the host system 420, Similarly, the protocol server module 477 spoofs the OS protocol stack 475 from the perspective of the host system 420 such that the host system 420 may unknowingly and/or unintentionally transmit to the protocol server module 477 the configuration and/or other data that is destined for the OS protocol stack 475 under the second protocol. The protocol server module 477 then may transport this data to the OS protocol stack 475 using the first protocol established there between.

Data packets that are destined to be communicated between the OS protocol stack 475 and the host system 420 are translated by the protocol server module 477 between the first protocol and the second protocol. For example, when the data packets include encapsulation, the protocol server module 477 may translate the data packets by removing the encapsulation from the data packets. Additionally or alternatively, the protocol server module 477 may translate the data packets by encapsulating the data packets using any one of several communications protocols.

The protocol server module 477 may interface directly with the OS protocol stack 475, or the client system 410 may further include an adapter 481 that the protocol server module 477 uses to interface with the OS protocol stack 475. For instance, in some operating systems in which the OS protocol stack 475 is implemented using a PPPD, the protocol server module 477 may interface directly with the PPPD without the need for an adapter 481. By contrast, in other operating systems, such as Windows™ operating systems, in which the OS protocol stack 475 is implemented using NDISWAN, the adapter 481 may be used to interface the protocol server module 477 and the NDISWAN protocol stack. More specifically, for example, a WAN ("Wide Area Network") Miniport adapter 481 may be used as a virtual modem to interface the protocol server module 477 and the NDISWAN.

In one implementation, the protocol server module 477 may include a PPP server module. When the protocol server module 477 functions as a PPP server module, it may capture a PPP communications session between the OS protocol stack 475 and the host system 420. The PPP server module also negotiates a PPP communications session with the OS protocol stack 475. The PPP server module may translate PPP data packets from the OS protocol stack 475 destined for the host system 420. For example, the protocol server module 477 may translate the data packets by removing the PPP encapsulation. The data packets may include data packets in a format consistent with, for example, Internet Protocol (IP) data, Transmission Control Protocol (TCP) data, other data capable of being encapsulated by an encapsulating protocol, or a combination of these data formats. The data packets may include Layer Three data packets. After removing the PPP encapsulation, the PPP server module may encapsulate the packets in any one of several encapsulating protocols (e.g., PPP, UDP, and L2TP). Additionally, the protocol server module 477 may translate data packets from the host system 420 by removing the encapsulation from the data packets and encapsulating the packets in PPP, and then may transport the packets to the client device OS protocol stack 475.

Additionally or alternatively, the protocol server module 477 may function to filter packets of data prior to transporting the packets to the host system 420. For instance, the protocol server module 477 may remove and discard any unnecessary data packets to reduce the communications bandwidth usage and/or to allow more communications bandwidth for the necessary data.

The protocol server module 477 enables the client system 410 to communicate with the host system 420 using various encapsulating protocols that are supported by the delivery network 436 and the host system 420, regardless of whether these protocols are otherwise supported by the client system 410. For instance, although a client system 410 may support only a PPP encapsulating protocol through its OS protocol stack 475, the protocol server module 477 may function to enable the client system 410 to communicate through the delivery network 460 with the host system 420 using other encapsulating protocols. In a more specific example, the protocol server module 477 generally enables the client system having only a PPP protocol interface to communicate with the host system 420 using, for example, Layer Two Tunneling Protocol (L2TP), PPP over Ethernet (PPPoE), User Datagram Protocol (UDP) tunneling, token tunneling (e.g., a P3 tunnel), any other encapsulating protocols and tunneling mechanisms, or a combination of these encapsulating protocols and tunneling mechanisms.

The protocol server module 477 may be implemented as a client application or as a software module within a client application (e.g., client application 278 of FIG. 2). The encapsulation may be performed by the protocol server module 477 or alternatively may be performed by a separate client application (e.g., PPP client, UDP client, PPPoE client, L2TP client, or AOL client).

The controller module 479 may be logically connected to the protocol server module 477 and may be structured and arranged to control communications between the OS protocol stack 475, the protocol server module 477, and the host system 420. The controller module 479 may be implemented as a client application or as a software module within a client application (e.g., client application 278 of FIG. 2). Additionally, the controller module 479 may function to control the communications device 484.

The communications device 484 typically has the attributes of and includes one or more of the communications devices described above with respect to communications device 284 of FIG. 2.

Figure 5:
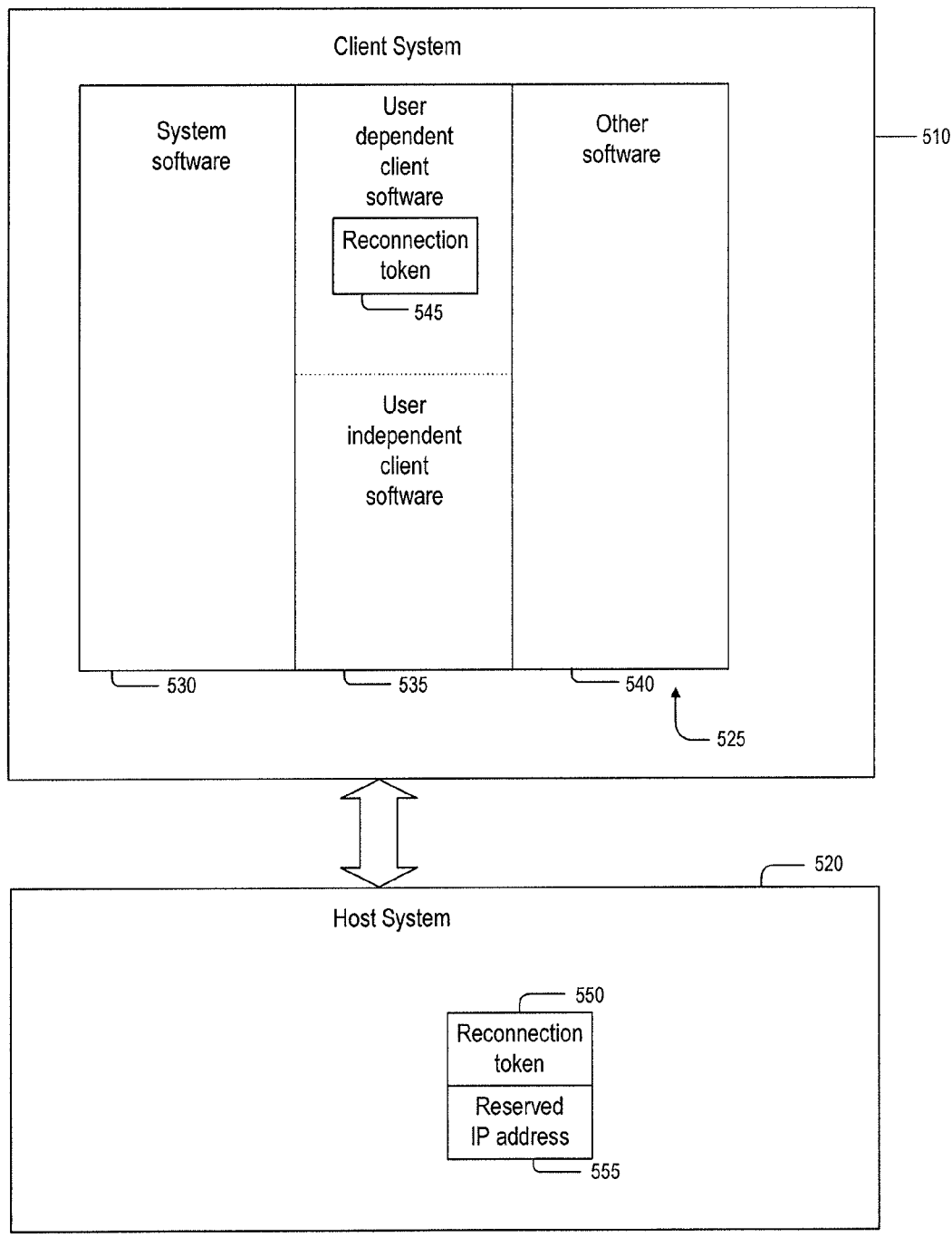
FIG. 5 is a block diagram illustrating a logical configuration of software elements within the client system of FIG. 1.

FIG. 5 illustrates aspects of a client system 510 that is authorized to communicate with a host system 520. In general, the client system 510 corresponds to elements 110, 210, 310, and 410 of FIGS. 1-4, and the host system 520 with which the client system communicates corresponds to elements 120, 220, 320, and 420 of FIGS. 1-4. However, either may be incorporated into other types of communications systems.

The client system 510 generally includes memory or storage 525. As shown, the memory 525 of the client system 510 contains system software 530, client software 535, and other software 540. In general, the system software 530 includes programs and data enabling operation of the client system 510, and the other software 540 includes other programs and data enabling the execution of applications and the storage and retrieval of data using the client system 510. While active, the system software 530 and the other software 540 generally are stored in the memory of a client communications system 510. However, while dormant, various aspects of the software may be located in other storage at the client system 510.

In general, the client software 535 includes programs and data files capable of enabling communications between the client system 510 and the host system 520. When communications are to be initiated with the host system 520, the client software 535 may be stored on the client system 510 and loaded into the memory of a client controller, such as that shown and described with respect to items 114, 214, and 314 of FIGS. 1-3.

The client software 535 generally includes several modules for performing various functions. Modules of the client software 535 may include user-independent software, user-dependent software and combinations thereof. User-independent software generally includes static information within the client software, such as fixed instructions and read only modules. By contrast, user-dependent software may include data reflecting user system attributes, such as modem type and speed, and processor characteristics. The user-dependent software also may include data related to particular users, such as demographic data, personalizable configuration data, and a reconnection token 545, which may be used to transparently reconnect to the host system after the communications session has been interrupted, such as described below with respect to FIGS. 6-8.

The host system 520 may store a reconnection token 550 corresponding to reconnection token 545, a reserved IP address 555 that may be used to reestablish an interrupted communications session such that a client application is not disrupted by the interruption in the communications session, and information (not shown) relating to the reconnection token 550 to the reserved IP address 555.

Figure 6:
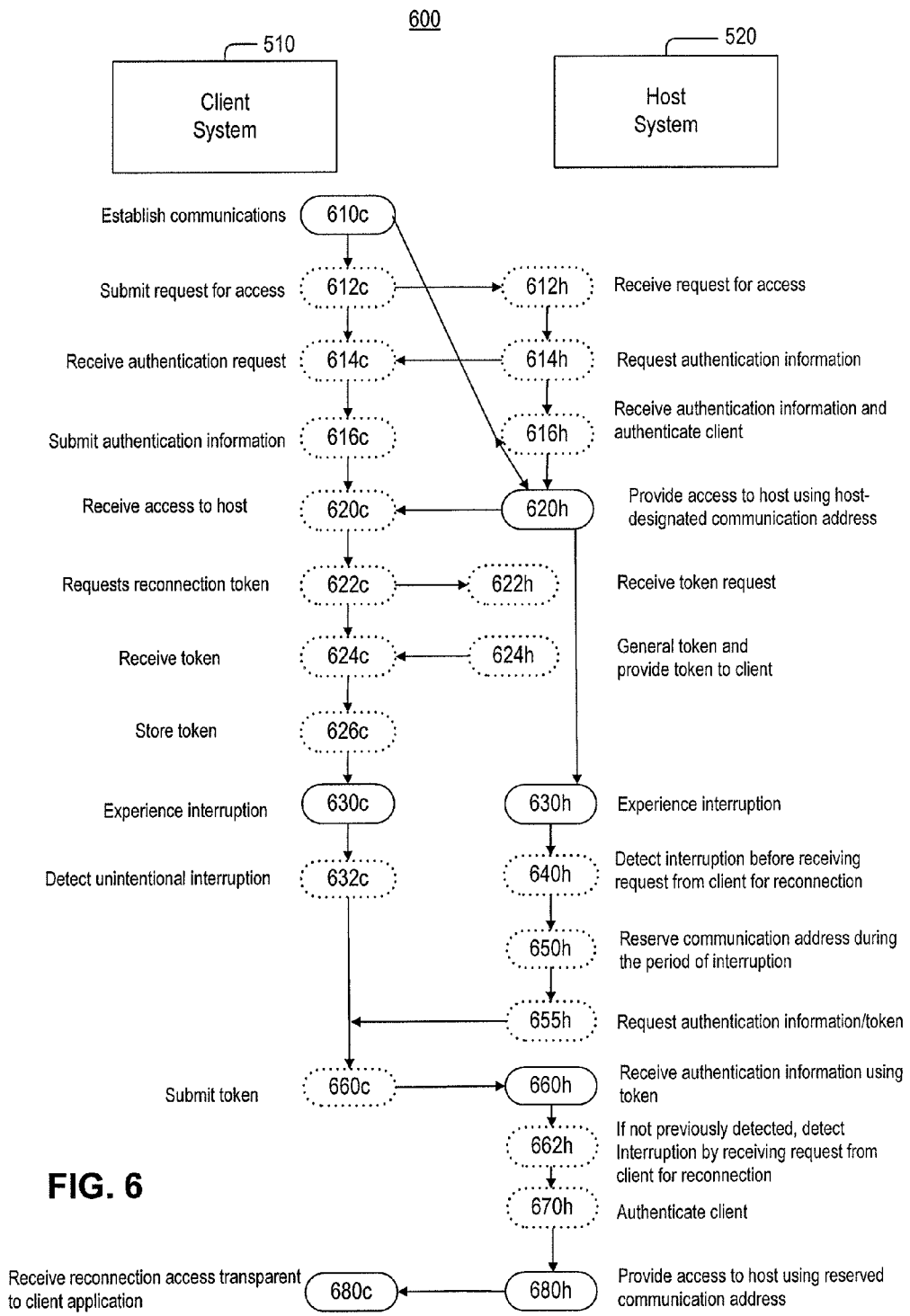
FIG. 6 is a block diagram illustrating communications between the client system and the host system to provide transparent reconnection to the client system.

Referring to FIG. 6, a procedure 600 may be used to provide transparent reconnection of a communications session between a client system 510 and a host system 520 if the communications session is interrupted. The procedure 600 begins when a communications session is established between the host system 520 and the client system 510 (step 610). Establishment of the communications session may be accomplished by having the host provide a host-designated communications address (step 620*h*). The host-designated communications address may be, for example, an Internet Protocol address. Alternatively, the communications address may be a port assigned by a Network Address Translator (NAT) or a phone number assigned for temporary use in a phone network. The communications address may be a numerical or alphabetical address (such as a domain name).

When the client and host systems experience an interruption in the communications session (steps 630*c* and 630*h*), the client system or the host system may detect the interruption (steps 632*c*, 640*h*, and 662*h*). However, to enhance security, it may be possible to limit detection of the interruption to the host system, thus reducing the opportunities for spoofing of authentic tokens.

Assuming that the client system is capable of detecting interruption and initiating the reestablishment of a communication session using the token, when the host system detects the interruption based on criteria other than receipt of an access request or token from a disconnected client system (step 640h), the host system reserves the communications address used in the interrupted communications session during the period of interruption (step 650h). The host system may reserve the address for a specific period of time (which may be referred to as the lifespan of the token) that is measured from the time of communications session interruption. This may be accomplished, for example, by having a list or table of issued tokens and storing the client system to which the token was issued and the time of interruption, if any, for each issued token.

If, during the lifespan of the token, the host system 520 receives a request for access from the client system 510 without the client system submitting the token, the host system 520 may take any of several actions, including terminating the session immediately, continuing to wait for the submission of the token or the expiration of the lifespan of the token, and providing access using a host-designated communication address that is not the same as the reserved communication address.

The host system 520 may request authentication information from the client system 510 (step 655h).

The host system may receive authentication information in the form of the token or otherwise (step 660h). If the host system has not yet otherwise detected the interruption of the communications session, receiving authentication information from a client system using a token may enable the host system to detect the communications session interruption (step 662h). The host system responds to receipt of authentication information by authenticating the client system (step 670h), which may involve determining whether the token submitted by the client system is valid (such as, by comparing the received token with a list of issued tokens, by looking up the token in a table that lists all valid tokens, or, if the token is time-limited or use-limited, determining whether it is expired). Host system 520 then provides access using the same communications address which was used in the interrupted communications session in order to reestablish communications with the client system (step 680h).

The client system 510 receives reconnection access such that at least one of the client applications making use of the communication session does not experience a disruption despite the communications session interruption; that is, at least one client application is unaffected by the interruption and the associated reconnection (step 680c). Moreover, some operating systems may terminate a client application upon loss of a connection to the host system on which the client application depends. An operating system on the client system 510, however, may be prevented from terminating a client application by masking the loss of the connection, for instance, by the use of a local protocol module that "spoofs" the operating system protocol stack and host system, as described with respect to FIG. 4.

In some implementations, the client system 510 may receive reconnection access using the same session identifier that was associated with the interrupted session (step 680c).

In some implementations the client system may detect the interruption and submit the token before the host system has detected the interruption. The host system may or may not detect the interruption before receiving an access request from a disconnected client system (steps 640h and 662h). Moreover, an unintentional interruption in the communications session (steps 630c and 630h) may be detected by the client system (step 632c). Detecting an unintentional interruption and submitting a token may occur at the client system with or without receiving notification of the disconnect or an authentication request from the host system.

To remedy the unintentional disconnect, the client system may submit a token to the host system (step 660c). More specifically, the client system may determine whether a token exists, retrieve the token from storage, and send the token to the host system. The token may be submitted automatically in lieu of or in addition to authentication information, unprompted, or in response to a request from the host system. Such a process generally preempts or replaces the display of a user interface soliciting reconnection or reauthentication information from a user.

Additionally or alternatively, the client system may inform the user of the client system about the interruption, for example, by displaying message. Informing the user of the client system of the interruption may be beneficial, for example, when the client system re-dials a modem to reestablish a connection with the host system so that the user is not surprised by the sound of the modem re-dialing.

Additional communications may be exchanged between the client system 510 and host system 520 to prepare for transparent reconnection when communications have been interrupted. For instance, a client system 510 may submit a request for access (step 612c), which is received by a host system (step 612h). The host system 520 may request authentication information from the client system (step 614h), which receives the authentication request (step 614c) and submits the requested authentication information (step 616c). Authentication information may include a user identifier (such as, for example, a user name, a screen name, or a phone number) and access password (such as, for example, a subscriber password or personal identification number ("PIN")), which may be used to authenticate the client system as authorized.

The host system 520 receives the authentication information and authenticates the client system (step 616h). The client system 510 may receive access to the host system 520 by receiving the host-designated communications address to use during a communications session (step 620c).

The client system 510 may request a reconnection token (step 622c), which may be used to reestablish communications between the host system and client system after an unintentional interruption of communications. The token may be valid only for one submission and may be valid only for a period of time, usually a short period of time, following an interrupted communications session.

The host system 520 may receive the token request (step 622h). The host system 520 may generate the token, relate the token to the host-designated communications address; store the token, host-designated communication address and the relationship between the token and address; and provide the token to the client system (step 624h), which receives step 624c) and stores the token (step 626c).

Figure 7:
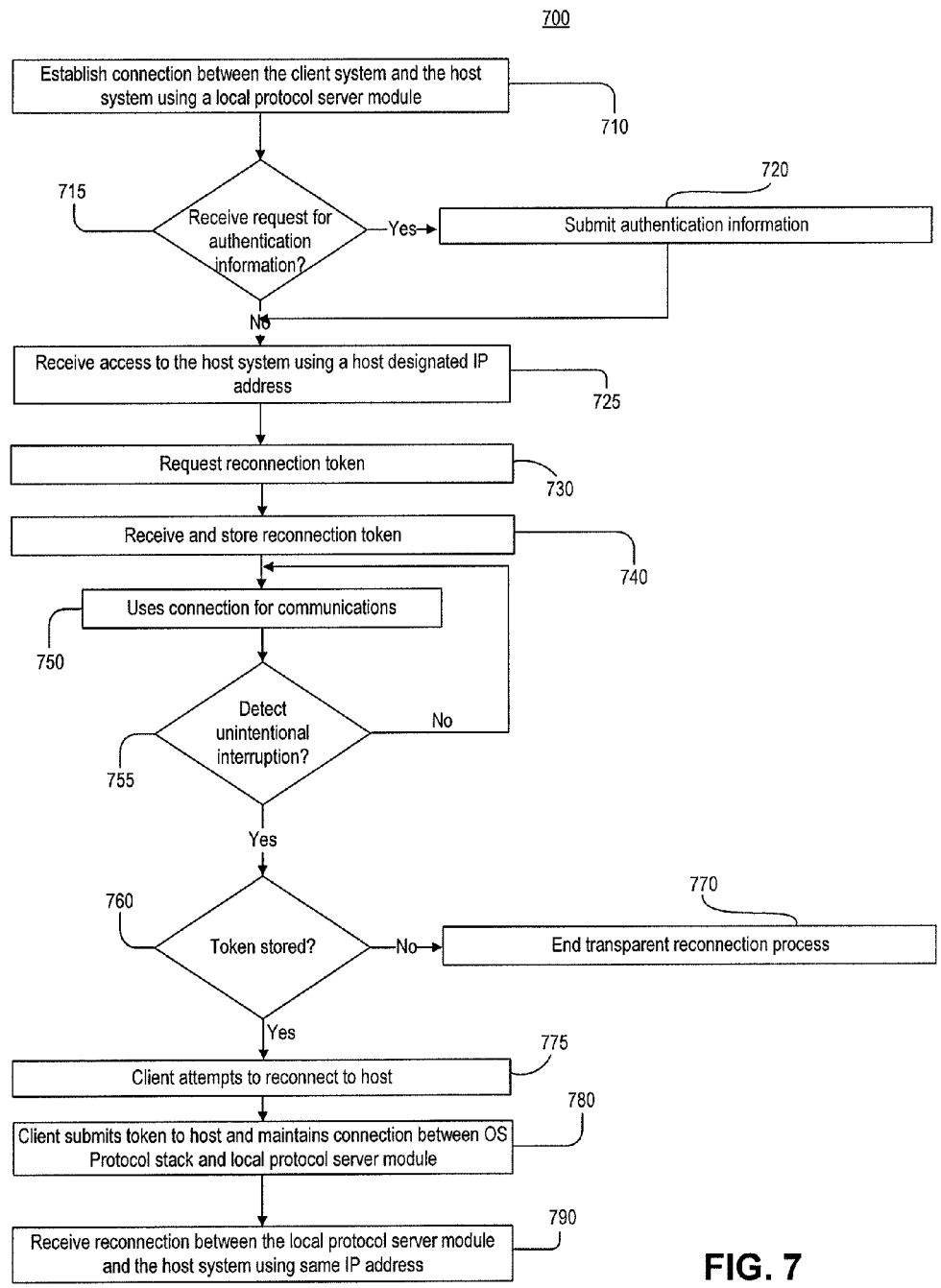
FIGS. 7 and 8 are flow charts of the processes performed to transparently reconnect a client device to a host system.

Referring to FIGS. 4 and 7, a connection and transparent reconnection process 700 may begin with the client system 410 establishing a connection between the client system 410 and the host system 420 using a local protocol server module 477 and an OS protocol stack 475 (step 710). The local protocol server module 477 directly interfaces with the OS protocol stack 475, includes a PPP server module, and handles PPP negotiation with the host system. The OS protocol stack 475 interfaces with client applications, including a client application which may require a persistent TCP/IP connection.

The client system determines whether a request for authentication information has been received from the host system (step 715), and, if so, submits authentication information (step 720). For example, the client system may submit authentication information in the manner described with respect to item 616c in FIG. 6.

The client system receives access to the host system using a host-designated IP address in the manner described previously with respect to item 620c in FIG. 6 (step 725). Here, the IP address is received by the local protocol server module 477, which provides the IP address to the OS protocol stack 475.

The client system requests a reconnection token from the host system in the in described with respect to item 622c in FIG. 6 (step 730) and receives and stores the reconnection token in the manner described with respect to items 624c and 626c in FIG. 6 (step 740). The client, system then proceeds with communications over the connection (step 750).

If the client system detects an unintentional interruption (step 755), the client system determines whether a reconnection token is stored (step 760). If so, the client system, or some portion thereof (typically the local protocol server module), attempts to reconnect to the host system (such as by using a modem to establish a connection with the host system) (step 775), submits the token to the host system in the manner described with respect to item 660c in FIG. 6 and maintains the connection between the OS protocol stack and the local protocol server module (step 780). The client system receives reconnection between the local protocol server module and the host system using the same IP address as used during the interrupted communications session in the manner described with respect to item 680c in FIG. 6 (step 790). If a reconnection token has not been stored, the communications session cannot be reestablished transparently and the process 700 ends (step 770).

Figure 8:
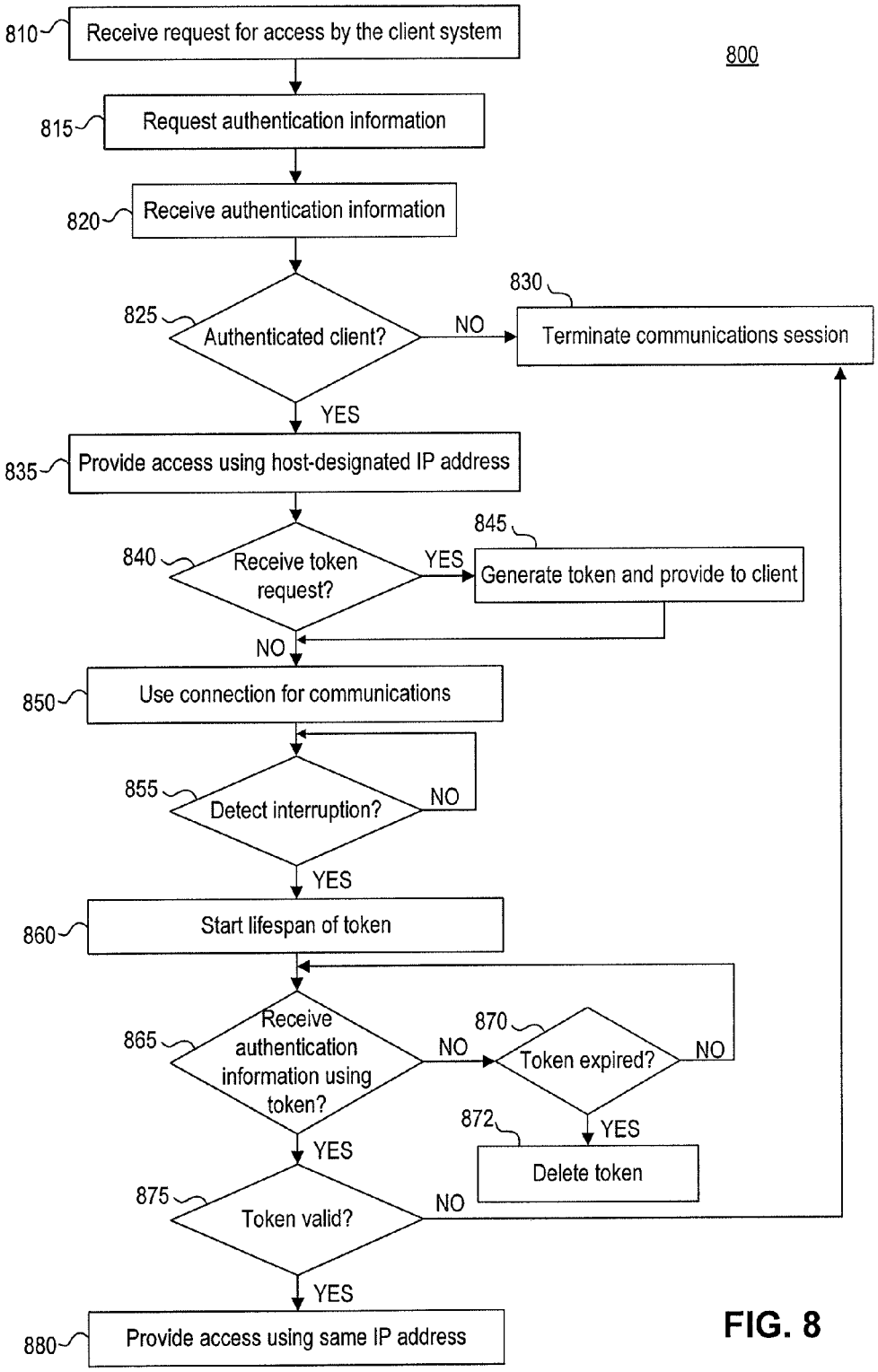

Referring to FIGS. 4 and 8, a connection and transparent reconnection process 800 may begin with the host system 420 receiving a request for access by a client system 410 (step 810). For example, the host system may receive a request for access in the manner described with respect to item 612h in FIG. 6. The host system 420 may request authentication information from the client system in the manner described with respect to item 614h in FIG. 6 (step 815). After receiving the authentication information in the manner described with respect to item 616h in FIG. 6 (step 820), the host system determines whether the client system is an authenticated client system (step 825), and if not, the host system terminates the communications session (step 830). If so, the host system provides access using a host-designated communication address (such as an IP address, NAT port, or telephone number) in the manner described with respect to item 620h in FIG. 6 (step 835).

If the host system receives a request for a token (step 840), the host system generates a token and provides the token to the client, such as in the manner described with respect to item 624h in FIG. 6 (step 845).

The host system then proceeds with communications over the connection (step 850).

The host system may detect an interruption (step 855). For example, the host system may detect an interruption when the host system receives notification that the telephone connection used for the communication connection with the client system has been disconnected.

If the host system detects an interruption (step 855), the host system may start the time period during which the token may be used for reconnection (step 860). This period may be referred to as the lifespan of the token and may represent the specific period of time during which the communications address is reserved. If the host system does not receive the token before the specific period of time has elapsed (which may be referred to as the expiration of the token) (step 870), the host system deletes the token or otherwise releases the reserved communications address (step 872). Some implementations may not terminate the communication session and may free the reserved communication address for use by the same or another client system.

If the host system has not received the token (step 865) and the token has not expired (step 870), the host system waits. If the host system receives authentication information from the client system using a token in the manner described with respect to item 660h in FIG. 6 (step 865). The host system determines whether the token is valid in the manner described with respect to item 670h in FIG. 6 (step 875). If the token is valid, the host system provides access using the reserved communication address in the manner described with respect to item 680h in FIG. 6 (step 880). If the host system determines that the token is not valid, the host system terminates the communications session (step 830).

Although FIGS. 1-8 illustrate transparent reconnection technology to be used to reconnect client systems and host systems, the benefits of transparent reconnection such that at least one client application making use of the interrupted communication session is not itself disrupted by the unintended interruption of a communications session extend to systems communicating in a client and host relationship and therefore are equally applicable to other contexts. For example, the benefits may be applicable to systems a accessed by a user system, such as in a point-to-point communications system.

Implementations may include a method or process, an apparatus or system, or computer software on a computer medium. It will be understood that various modifications may be made without departing from the spirit and scope of the following claims. For example, advantageous results still could be achieved if steps of the disclosed techniques were performed in a different order and/or if components in the disclosed systems were combined in a different manner and/or replaced or supplemented by other components.

What is claimed is:

1. A method for communicating between a client and an accessible system, the method comprising:

requesting, by the client, a communications session complying with a communications protocol between the client and the accessible system;

receiving, at the client, an accessible-system-designated communications address for accessing the accessible system;

requesting, by the client, a reconnection token from the accessible system;

receiving, at the client, the reconnection token from the accessible system;

detecting an interruption in the communications session complying with the communications protocol;

masking the interruption of the communications session complying with the communications protocol from at least one client application communicating with the accessible system; and reestablishing, using the accessible-system-designated communications address, the communications session complying with the communications protocol by submitting the reconnection token to the accessible system, wherein the client application communicating with the accessible system does not experience a disruption.

2. The method of claim 1, wherein the client application does not detect that the interruption and the reestablishment of the communications session complying with the communications protocol has occurred.

3. The method of claim 1, wherein the reconnection token has a lifespan determined by the accessible system.

4. The method of claim 1, wherein submitting the reconnection token to the accessible system occurs within a predefined period of time after detecting the interruption.

5. The method of claim 1, wherein the accessible system requests the reconnection token from the client.

6. The method of claim 1, wherein submitting the reconnection token to the accessible system further comprises:
   determining, at the client, whether the reconnection token has been received, and
   if the reconnection token has been received, retrieving the reconnection token and sending the reconnection token to the accessible system.

7. The method of claim 6, wherein sending the reconnection token to the accessible system comprises sending the reconnection token and authentication information to the accessible system.

8. The method of claim 1, wherein submitting the reconnection token to the accessible system occurs after the client receives an authentication request from the accessible system.

9. The method of claim 1, wherein the accessible system-designated communications address comprises an Internet Protocol address for accessing the accessible system.

10. The method of claim 1, wherein the accessible-system-designated communications address is unique to the client.

11. The method of claim 1, wherein masking the interruption comprises accessing a local protocol module that causes an operating system protocol stack to not detect the interruption.

12. The method of claim 1, wherein the interruption in the communication session complying with the communications protocol is detected by the accessible system.

13. A computer-based system comprising at least one processor and a storage medium that stores a plurality of instructions, the plurality of instructions being executable by the at least one processor for:

receiving a request, from a client, for a communications session complying with a communications protocol between the client and an accessible system;
   sending, to the client, an accessible-system-designated communications address for accessing the accessible system;
   receiving a request, from the client, for a reconnection token;
   sending, to the client, the reconnection token;
   detecting an interruption in the communications session complying with the communications protocol;
   masking the interruption of the communications session complying with the communications protocol from at least one client application communicating with the accessible system; and
   reestablishing, using the accessible-system-designated communications address, the communications session complying with the communications protocol by receiving the reconnection token at the accessible system, wherein the client application communicating with the accessible system does not experience a disruption.

14. The system of claim 13, wherein the reconnection token has a lifespan determined by the accessible system.

15. The system of claim 13, wherein receiving the reconnection token at the accessible system occurs within a predefined period of time after detecting the interruption.

16. The system of claim 13, wherein receiving the reconnection token at the accessible system comprises receiving the reconnection token and authentication information at the accessible system.

17. The system of claim 13, wherein receiving the reconnection token at the accessible system occurs after the accessible system sends an authentication request to the client.

18. The system of claim 13, wherein the accessible-system-designated communications address is unique to the client.

19. The system of claim 13, wherein masking the interruption is performed within a local area network that comprises the client.

20. The system of claim 13, wherein the interruption in the communication session complying with the communications protocol is detected by the accessible system.

* * * * *